(12) United States Patent
Couture

(10) Patent No.: US 6,494,091 B2
(45) Date of Patent: Dec. 17, 2002

(54) APPARATUS FOR MEASURING A GRAVITATIONAL ATTRACTION OF THE EARTH

(76) Inventor: Gilles Couture, 7580 Béique, Montreal, Que. (CA), H4K1A3

(*) Notice: Subject to any disclaimer, the term of this patent is extended or adjusted under 35 U.S.C. 154(b) by 144 days.

(21) Appl. No.: 09/793,976

(22) Filed: Feb. 28, 2001

(65) Prior Publication Data

US 2002/0152810 A1 Oct. 24, 2002

(51) Int. Cl.[7] ................................................. G01V 7/04
(52) U.S. Cl. ....................... 73/382 R; 505/843; 505/846
(58) Field of Search ........................... 73/382 R, 382 G; 505/842, 843, 845, 846

(56) References Cited

U.S. PATENT DOCUMENTS

| | | | |
|---|---|---|---|
| 3,424,006 A | 1/1969 | Dicke et al. | 73/382 |
| 3,657,927 A | 4/1972 | Tyson | 73/505 |
| 3,727,462 A | 4/1973 | Stone et al. | 73/382 |
| 4,280,095 A | 7/1981 | Hinton | 324/248 |
| 5,058,431 A | 10/1991 | Karwacki | 73/505 |
| 5,173,660 A | 12/1992 | Marsden | 324/248 |
| 5,637,797 A | 6/1997 | Zumberge et al. | 73/382 R |
| 5,786,690 A | 7/1998 | Kirtley et al. | 324/248 |
| 5,892,151 A | 4/1999 | Niebauer et al. | 73/382 R |
| 5,962,781 A | 10/1999 | Veryaskin | 73/382 |

OTHER PUBLICATIONS

A.W. Oven hausen & R. Colella, Phys. Review, vol. 33, No. 20, Nov. 11, 1974 "Experimental Test of Gravitationally Induced/ Quantum Interference".

R. Colella & A.W. Oven hausen, Phys. Review, vol. 34, No. 23, Jun. 9, 1975 "Observation of Gravitationally Induced Quantum Interference".

Primary Examiner—John E. Chapman
(74) Attorney, Agent, or Firm—Mila Shvartsman

(57) ABSTRACT

Apparatus for measuring gravitational attraction of the Earth comprising a loop formed from a superconductor material. The loop being divided into a first portion and a second portion having a predetermined length and configuration. The loop being positioned under predetermined angle with respect to a horizontal plane. There are also means for initiation of a flow of superconducting carriers in each of first and second portions, and at least one phase shift inducing means formed in the loop. The first portion being positioned with respect to the second portion in such a way that the superconducting carriers conducted through the first portion spend a period of time at a different gravitational potential of the Earth than superconducting carriers conducted through the second portion, thus creating a gravitationally induced phase shift. The apparatus being completely isolated from influence of any external magnetic field. There also shown a method of measuring an absolute value of gravity of the Earth including measuring the current flowing through the superconductor loop of the apparatus at initial position, tilting the apparatus by tilting means under predetermined angle, wherein the current flowing through the superconductor loop is being continuously measured during tilting of the apparatus, measuring the current flowing through the superconductor loop at a final position. The tilting means are adapted to facilitate a precise control of an angular displacement of the apparatus from the initial position to the final position.

21 Claims, 15 Drawing Sheets

APPARATUS FOR MEASURING A GRAVITATIONAL ATTRACTION OF THE EARTH

The present invention relates to a measuring apparatus, and more precisely to a gravity meter. It uses a superconducting quantum interference device also known as SQUID.

DESCRIPTION OF RELEVANT PRIOR ART

There are three relevant types of prior art: gravimeters, SQUIDs and quantum gyroscopes.

1. Gravimeters

Gravimetry is an old art that has reached a level of precision and accuracy that few fields of science enjoy. There are different types of industries that are interested in gravimetry. A physicist might want to measure the variation of gravity with latitude, while a geophysicist will be interested in gravity in order to improve the current models of the interior of the Earth. The oil industry is also interested in gravity because a decrease in local gravity might indicate an oil field deep underground. This justifies the very large effort made into the development of equipment to obtain a more precise and accurate value of $\vec{g}$ and $|\vec{g}|$.

There are basically three types of gravimeters: pendulum, spring and free-fall. The quest for ever more precise measurements has brought very many variations on the basic principle of an oscillating mass (pendulum), an elongated spring and free-falling objects. When measuring gravity, there are two types of measurements one is interested in: the absolute value of gravity at a given point and the variation of gravity with time at a given point. Different equipment will be used for these different measurements. Free-fall equipment clearly leads to an absolute value of gravity, while spring leads to a relative value of gravity. The-use of sprig equipment then requires the measurement of an absolute value of gravity at a given point that is used as a standard.

The modem free-fall equipment uses a laser beam directed on a retro-reflector that is in free-fall. The free-fall path is one arm of an interferometer, and one simply records the passage of interference fringes with time. From this information it is possible to extract the absolute value of g at the point where the free-fall occurred. Clearly, this value of g is the average value of g over the path of the free-fall Such devices have been designed for measurements on land (U.S. Pat. No. 3,727,462), in boreholes (U.S. Pat. No. 5,892,151) and in the water (U.S. Pat. No. 5,637,797).

The measurements of $\vec{f}$ or $|\vec{g}|$ have been so precise for the last 15 years, that time variation of $\vec{g}$ have now been observed. The period of "oscillation" varies from seconds to hours, and this phenomenon is still not very well understood. One possible explanation is that the continents oscillate due to the atmospheric pressure.

Superconductivity has also been used to measure gravity. An early attempt at using superconductivity in gravimetry is shown in U.S. Pat. No. 3,424,006 where a superconducting floating element is magnetically suspended in a superconducting ring. The upper face of this element is used as a mirror and constitutes one arm of an interferometer. If g changes with time, the suspended element will rise or fall in the superconducting ring, and this will lead to a shift in the interference fringes. One simply has to record the position of the fringes with the time and then deduce the stability of $\vec{g}$ with time.

A more recent attempt at the use superconductivity in gravimetry-is-shown in U.S. Pat. No. 5,962,781. In this patent, a superconducting string is used as an antenna connected to driving solenoids in resonance. If $\vec{g}$ changes with time, the position of the string will slightly change and the resonance will be lost. Since the system is in resonance, it is very sensitive to any variation of position or variation of $\vec{g}$.

Another recent use of superconductivity in gravimetry is shown in the design of GWR Instruments Inc., San Diego, Calif., USA, where a spinning superconducting sphere is suspended in a magnetic field. This superconducting magnetic field is very stable and acts essentially as a spring to support the bulk of the sphere. A second magnetic field is provided by a coil and the position of the sphere is provided by an electronic circuit where one of the components is the sphere. If $\vec{g}$ changes with time, the sphere will slightly move in the magnetic fields and feed-back circuit changes the current in the coil in order to bring back the sphere to its original position. The change in current is produced by a change in voltage, and the voltage is simply recorded every few seconds or minutes depending on the user. This is a very good system to measure the stability of $\vec{g}$ with time, but is not capable of measuring the absolute value of $\vec{g}$ since the bulk of the weight of the sphere is supported by the superconducting magnetic field. This equipment provides the most sensitive data of the to variations of $\vec{g}$ with time.

Most of the known devices have limitations and deficiencies. For example, the device that uses a spring system will suffer from loss of stiffness of the spring over time and is very sensitive to temperature changes. Also, most, if not all of them measure either $|\vec{g}|$ or $\vec{g}(t)$, but not both. The free-fall apparatus using a laser beam reaches a high precision of $|\vec{g}|$ at a given point only after several measurements are combined in order to reduce the statistical error. For example, the device known as JILA-2 manufactured by Micro-G Instruments, Boulder, Colo., USA, requires about 2000 falls which will take 2–3 hours to measure. This equipment is not designed to monitor $\vec{g}(t)$, primarily due to the wear and tear of the equipment. The same comment applies to the spinning superconducting sphere, since it is designed to monitor $\vec{g}(t)$, but cannot get $|\vec{g}|$.

Another problem with the previous equipment is that of vibration: the free-fall device is not particularly sensitive to vibrations since its reference beam is suspended by a spring to cancel the vibrations through a retro-action electronic system. The GWR gravimeter, however, is very sensitive to vibrations in view of a mass suspended in a magnetic field. A third problem is the weight and portability of the equipment. Clearly, it is an asset to have the equipment that is light and can be easily carried to any point on Earth. The free-fall device (such as the JILA-2) is light and portable, but GWR equipment is very heavy (about 1 ton) and cannot be carried easily.

The purpose of the present invention is to solve these problems and to provide a single apparatus capable of measuring both $\vec{g}(t)$ and $|\vec{g}|$ very quickly and precisely. The apparatus of the present invention will allow to measure $|\vec{g}|$ at a given instant, then monitor it for a certain period of time by measuring g(t), and then measure $|\vec{g}|$ again to check for consistency. Another advantage of the present invention is the fact that it is practically immune to vibrations, thus opening a new venue of studies in geophysics, variations of $|\vec{g}|$ during an earthquake and many other possibilities. The present invention is also unaffected by temperature, and can be made relatively light through to the use of a superconductors at high critical temperatures, thus greatly reducing the costs and bulkiness of the refrigerating equipment.

2. SQUIDS

Superconducting quantum interference devices (SQUIDs) are based on the quantization of the magnetic flux through a superconducting loop and on the Josephson effect; they are used mostly as very sensitive magnetic field detectors. In general, a SQUID is a loop of superconducting wire where one has built one or more Josephson junctions. When used as a magnetic field sensor, they are most often connected to a pick-up coil generally much larger than the SQUID itself. A slight variation of the ambient magnetic field will induce a current in the pick-up coil, which in turn induces a current the SQUID. This last current is quantized, which makes this a very sensitive device. SQUIDs have been used for several decades now as magnetic field sensors, and the technology is well known and is quite advanced For example, one can place 3 SQUIDs in a particular alignment in order to get $\vec{B}$ in a single measurement, as shown in U.S. Pat. No. 5,786, 690.

There is known another design of gravimeter that uses a SQUID comprising of a pair of masses that are part of an inductance circuit. This inductance itself is a part of an electrical circuit, and a SQUID is inductively connected to this circuit. If g varies, the masses will move relative to each other: this will change the inductance, then the current in the circuit, and finally, the current in the SQUID (see Paik, H. J., SQUID Applications to Geophysics, H. Weinstock and W. C. Overton eds., pp 3–12, Soc. of Exploration Geophysicists, Tulsa, Okla., 1981, Mapoles, E. A. ibid, pp 153–157).

3. Superconducting Gyroscopes

One of the first patents to use a phase in a gyroscope is shown in U.S. Pat. No. 3,657,927 to J. A. Tyson. The basic principle is that a wave moving in a medium will undergo a phase shift whose magnitude will depend on whether the wave in going in the direction of motion of the medium or whether it is going against the motion of the medium. This principle has been known for a long time and some designs were made at the beginning of the twentieth century to observe this phenomena with light. This principle is fundamental to the ring-laser gyroscope. The previously mentioned patent noted that in a superconductor, the Cooper pairs are coherent throughout the material, which is the basic principle of superconductivity. Since Cooper pairs can be thought of as a wave, it then follows that they will acquire a phase whether the supercurrent is going in the detection of motion of the superconductor or against its motion. Since the current in a SQUID depends greatly on the relative phases acquired along the paths that define the loop, one could expect that a SQUID be a very sensitive motion or rotation detector. This is indeed the basic idea of the above patent.

This principle has been used more recently in U.S. Pat. No. 5,058,431 showing that the critical variable for this effect to be observable is the area enclosed by the superconducting loop. The size of the induced phase shift is directly proportional to the area of the superconducting loop.

SUMMARY OF THE INVENTION

The apparatus of the present invention is basically a SQUID of a particular design which is shielded as well as possible from any magnetic field; since a magnetic field is highly undesirable, there are no pick-up coils connected to the SQUID of the present invention. The SQUID can be of macroscopic dimensions, but preferably it should be of microscopic dimensions. It can be fixed to a substrate or directly etched in a superconducting matrix. It is covered completely with a superconducting material leaving only the connectors uncovered. The whole system must be immersed in a cold liquid in the container in order to reach superconductivity. This container itself is mounted on a tiltable system that would allow the user to tilt the container at will.

In order to get a measurement of the absolute value of $\vec{g}$, one simply tilts the container. This tilt will produce a phase shift the Cooper pairs of the SQUID's loop, and this phase shit, which depends on $\vec{g}$, will produce a change in the current flowing in the SQUID. Thus, knowing the angular displacement covered by the movement of the apparatus, it is possible to extract the absolute value of $\vec{g}$.

In order to obtain the variation of $\vec{g}(t)$ with time, one simply lets the current flow in the SQUID. If $\vec{g}(t)$ changes with time, it will produce a change in the phase shift and a change in the current flowing in the SQUID.

In order to reduce the inductance of the SQUID and thus the effect of any stray magnetic field that might have penetrated the shielding, several designs are proposed to eliminate this problem In contrast to SQUIDs used as magnetometers, the effective area of the loop of the present invention can be as small as one wishes.

DETAILED DESCRIPTION OF THE PREFERRED EMBODIMENTS

Figure 1:
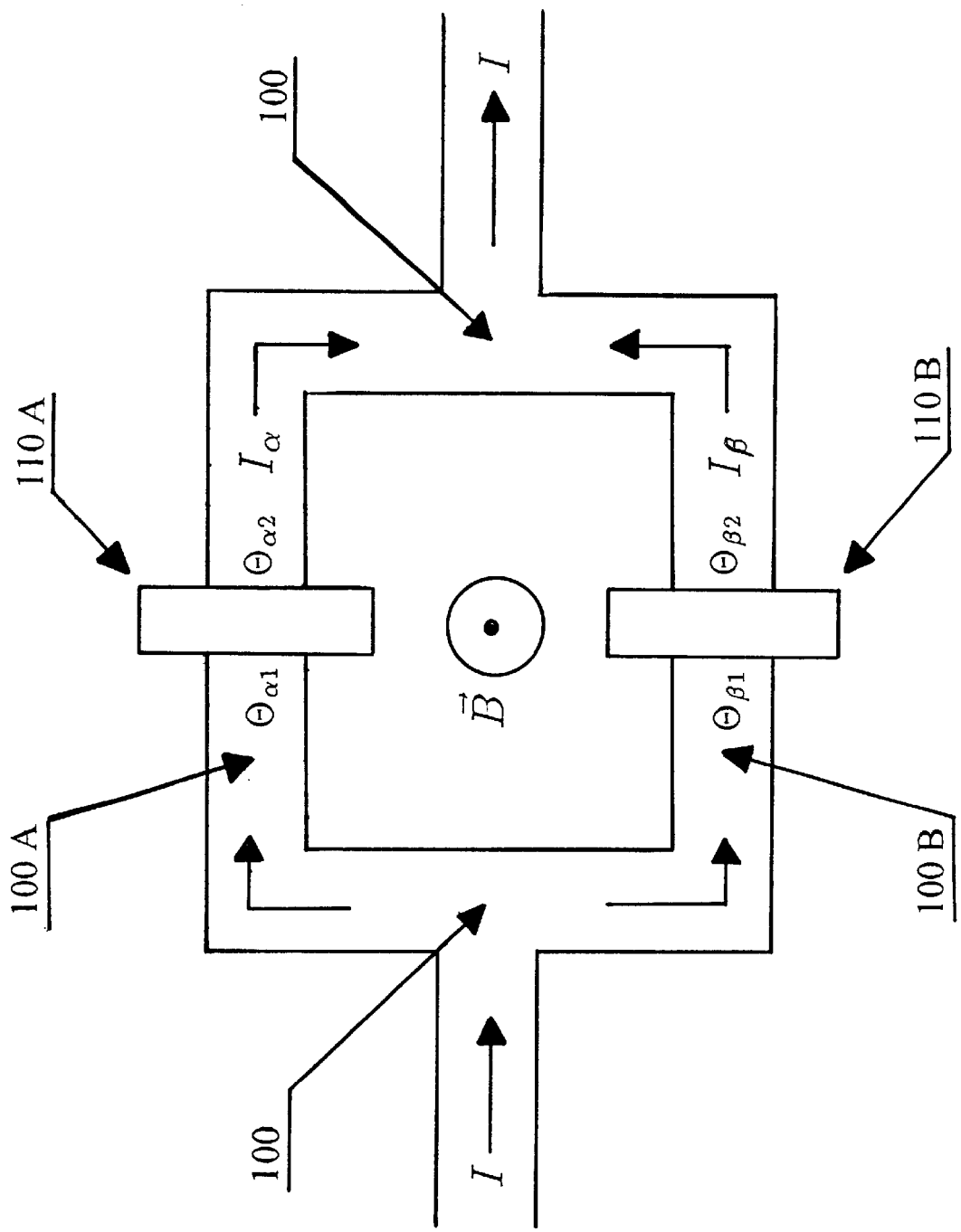
FIG. 1 is a side view on a superconductor loop of a SQUID.

In order to explain the main principle of the present invention, it is necessary to explain in more details the fundamental principles of a SQUID. As it is explained in "Superconductivity" by Charles P. Poole Jr., Horacio A. Farach, Richard J. Creswick, Associated Press, 1995, and referring to FIG. 1, we have a loop 100 made of superconducting material and comprising an upper portion 100A and a lower portion 100B. Along this loop there are formed two Josephson junctions: one in the upper portion 100A and one in the lower portion 100B. We will assume that the whole loop is in a magnetic field $\vec{B}$. The superconducting current (I) splits into two parts: one that goes in the upper portion ($I_\alpha$) and one that goes in the lower portion ($I_\beta$). The quantum phases associated with the Cooper pairs on either side of the Josephson junctions are labelled as $\theta_{\alpha 1}$ and $\theta_{\alpha 2}$ for the upper portion and $\theta_{\beta 1}$ and $\theta_{\beta 2}$ for the lower portion. It is important to note that "upper" and "lower" are just symbolic labels and have no physical meaning since we completely ignore gravity. The fundamental equation that governs SQUID is:

$$\int \vec{\nabla} \theta \cdot \vec{dl} = \frac{2\pi \Phi}{\Phi_0} \qquad (1)$$

where $\theta$ is the phase of the wave function of the charge carriers of the supercurrent, $\Phi$ is the magnetic flux through the superconducting loop and $\Phi_0$ is the quantum of magnetic flux ($\Phi_0$=h/e where h is the Planck constant and e is the magnitude of the charge of the electrons). If we follow the path around the loop of FIG. 1, we get:

$$(\Theta_{\alpha 2} - \Theta_{\alpha 1}) - (\Theta_{\beta 2} - \Theta_{\beta 1}) = \frac{2\pi \Phi}{\Phi_0} \qquad (2)$$

where we have assumed that the size of the Josephson junctions is much smaller than the size of the loop. We see now that the phase difference across the Josephson junction is the crucial value, and not the phase itself If we call $\theta_{\alpha 2} - \theta_{\alpha 1} = \phi_\alpha$ and $\theta_{62\ 2} - \theta_{\beta 1} = \phi_\beta$, we then obtain $\phi_\alpha = \phi_\beta + 2\pi\Phi/\Phi_0$. From charge conservation we see that $I_\alpha + I_\beta = I$. Each current must obey its own Josephson equation, and we have:

$$I = I_c^\alpha \sin(\phi_\alpha) + I_c^\beta \sin(\phi_\beta) \qquad (3)$$

$$I = I_c^\alpha \sin(\phi_\alpha) + I_c^\beta \sin\left(\phi_\alpha - \frac{2\pi \Phi}{\Phi_0}\right)$$

wherein $I_c^\alpha$ and $I_c^\beta$ are the critical currents of the upper and lower portions respectively.

If we also assume that the currents are equal in the two arms, we get:

$$I = 2I_c \sin\left(\phi_\alpha - \frac{\pi \Phi}{\Phi_0}\right) \times \cos\left(\frac{\pi \Phi}{\Phi_0}\right) \qquad (4)$$

where $I_c$ is the critical current of the SQUID and the maximum current the superconducting material can carry. The above equation is the same for any shape of the loop.

As it was described above, a wave can acquire a phase shift as it moves through a moving medium, this was used in the operation of the ring laser gyroscope and in the superconducting gyroscopes. However, besides the presence of the phase shift induced by the rotation of the superconductor, there also exists an additional quantum mechanical phase shift neglected up to now in the study of the SQUID. It is the purpose of the present invention to take advantage of this quantum mechanical phase shift and to use such discovery in creating a SQUID as a sensitive gravimeter.

Figure 2:
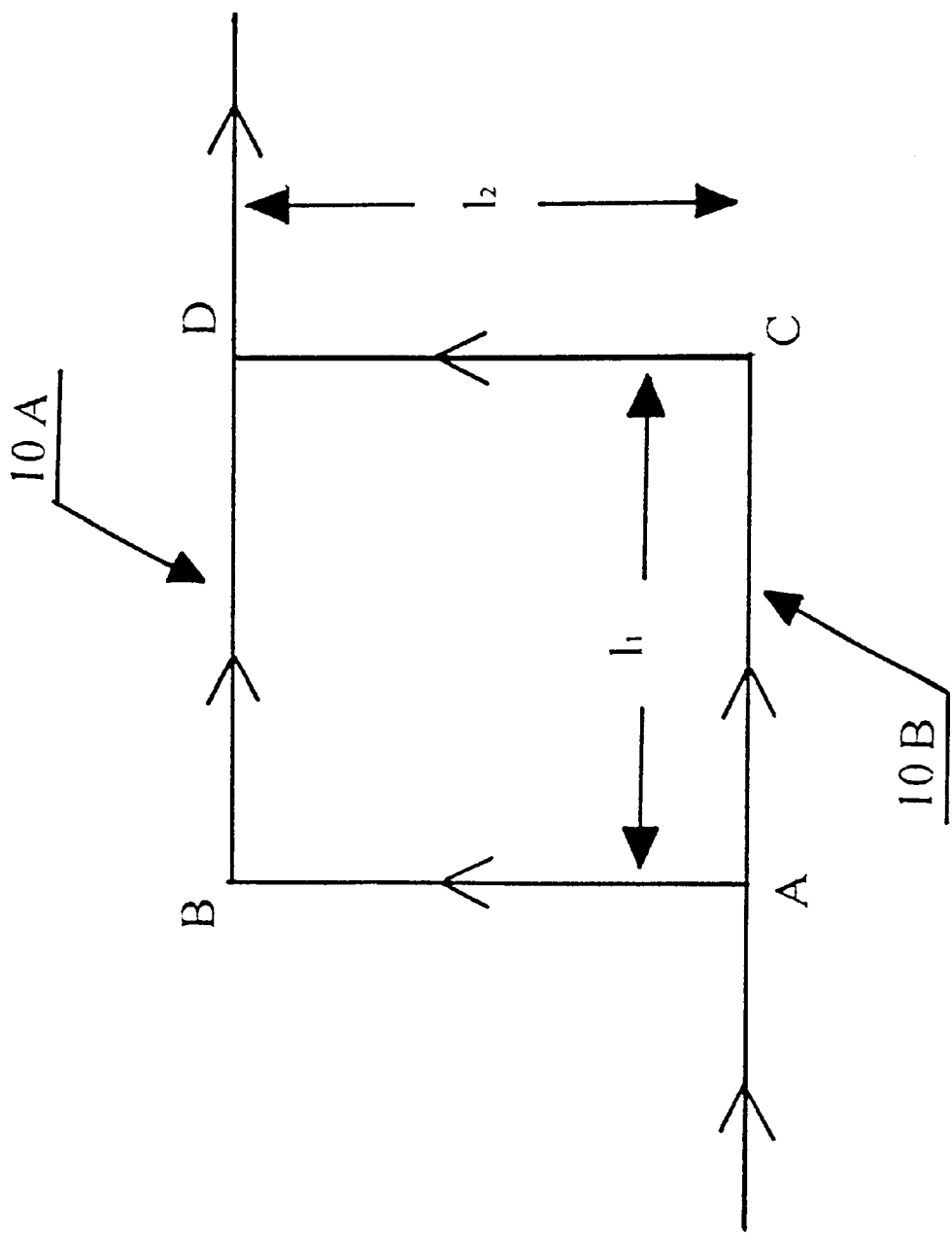
FIG. 2 is a schematic modification of the loop of FIG. 1.

The quantum mechanical phase shift uses the loop of FIG. 2 similar to one mentioned in Sakurai, J. J., Modern Quantum Mechanics, Addison-Wesley, 1995, p. 170. FIG. 2 shows two portions: upper potion 10A and lower portion 10B. For the simplicity, on FIGS. 2–13 and 15 the flow of current carriers is indicated by an arrow. Clearly, this current can flow in the opposite direction. Let us assume now that we have a beam of monoenergetic particles. In quantum mechanics, one associates a wave or wavepacket to a particle. If we assume that the size of two paths (ABD and ACD) is much larger than the size of the wave packets associated to the particles in the beam, a description using classical trajectories is appropriate. The wave associated to each particle is simply its de Broglie wavelength:

$$\lambda = \frac{h}{p} = \frac{h}{\sqrt{2m(E - V(x))}} \qquad (5)$$

where h is Planck's constant, p is the momentum of the particles, E is its energy and V(x) is the potential. Since the gravitational potential is time-independent (or varies very little during the time it takes for the particles to go from A to D), the sum of kinetic potential energy is constant:

$$p^2/2m + mgz = E \qquad (6)$$

where g is the gravitational constant and z is the height of the path.

If the plane defined by the two paths is horizontal, we can neglect the potential due to gravity because it is constant and the absolute potential is insignificant. Therefore, we can set the potential to 0. If now we tilt the plane by an angle $\delta$ with respect to the horizontal plane, things are quite different. The potential at level BD is higher than the potential at level AC by the amount $mgl_2 \sin(\delta)$. This means that the wavelength associated with particles travelling along path BD is longer than that associated to those travelling along the path AC. Therefore, the state vector used to describe the particles moving along the path BD (the term ket is used in quantum mechanics) will rotate faster than the ket associated with path AC. This leads to a phase difference between the wave packets arriving at point D. There is also a phase change associated with paths AB and CD, but these two are identical and cancel each other. If we label the phase acquired by the ket that goes along the upper path (ABD) as $\phi_{ABD}$ and the phase acquired by the ket that goes along the lower path (ACD) as $\phi_{ACD}$ the total phase shift associated with the paths is:

$$\phi_{ABD} - \phi_{ACD} = -mgl_2 \sin(\delta) t/\hbar \qquad (7)$$

We now see that it is possible to control this phase shift by changing $\delta$ and $l_2$. If we now express the time spent by the particles along the path BD in terms of $\Lambda = \lambda/2\pi$ we get to the following expression of the phase shift:

$$\phi_{ABD} - \phi_{ACD} = \frac{-m^2 g l_1 l_2 \Lambda \sin(\delta)}{\hbar^2} \qquad (8)$$

We have now gained a third way to control this phase shift: $l_2$. This is the fundamental expression that we want to use in the present invention. This effect has been observed before with neutron beams (see R. Colella, A. W. Overhauser, S. A. Werner, Phys. Rev. Lett., 34, p. 1472, 1975 and see A. W. Overhauser and R. Colella, Phys. Rev. Lett. 33, p. 1237, 1974). In this experiment a beam of nearly mono-energetic neutrons was split in two. The two beams followed different paths at different heights and were recombined at point D. At points A B C D a crystal would deviate the neutrons. After the beams were recombined three detectors would allow the observers to count the neutrons in a given direction. The phase shift induced by gravitation would make the counting rate larger in a given direction while there would have been no enhancement if the phase shift was absent. The phase shift predicted by the previous equation was verified with high accuracy.

It is this gravitationally-induced phase shift that has been neglected up to now in the analysis of SQUIDs. However, one has to be careful in interpreting equation (8). One might be tempted to think that, as in the case of the rotationally-induced phase shift, the area of the loop is the important parameter since $l_1 l_2$ defines this area, but this is not true. One has to remember that $l_1$ answers the question "How high did you go?" and $l_2$ answer the question "How long did you stay up there?". One then must conclude that any path, whatever the shape, that can answer these two questions, will lead to this gravitationally-induced phase shift. This leads to several different designs of the SQUID according to the present invention.

Figure 3:
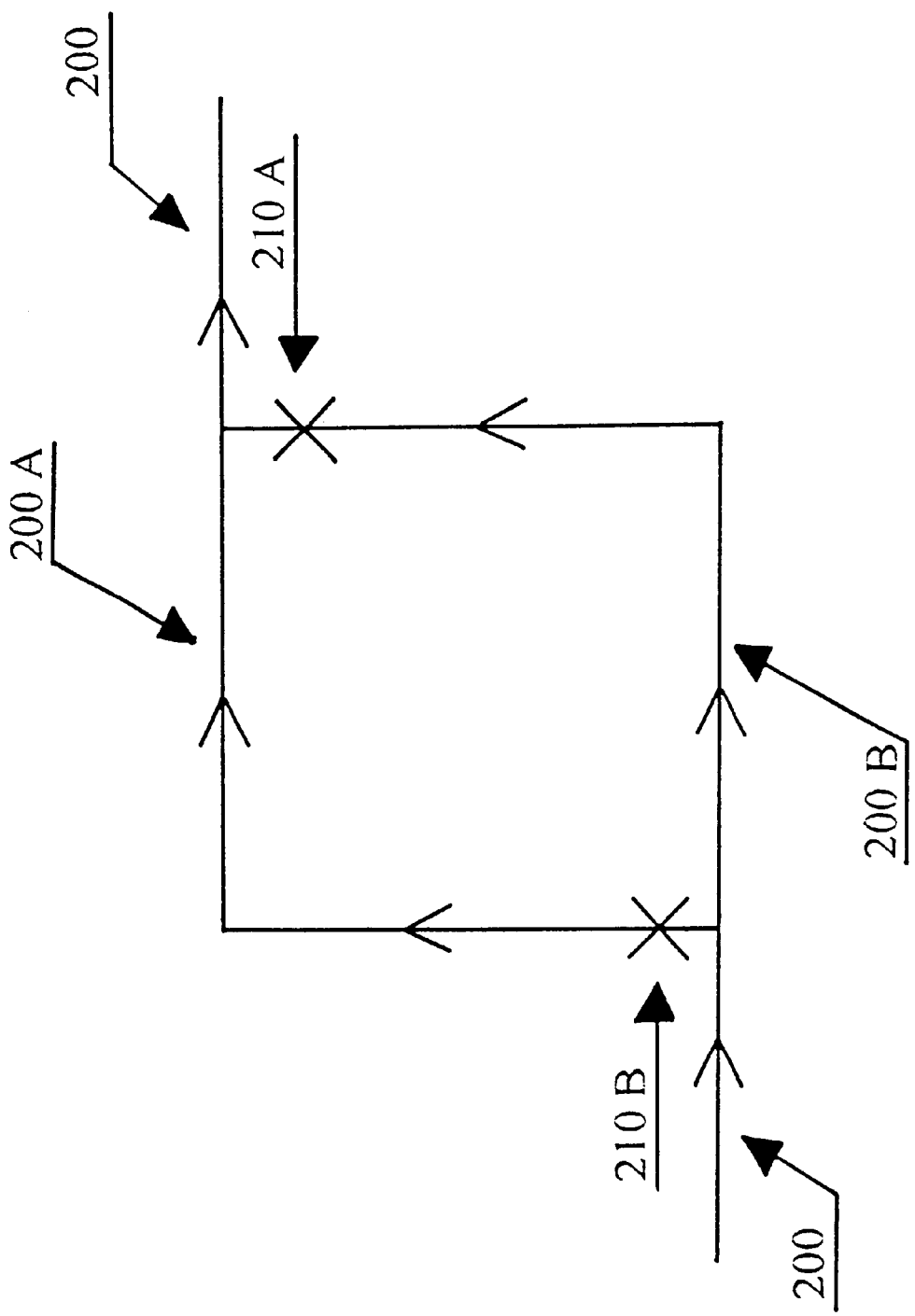
FIG. 3 shows loop of FIG. 2 with Josephson junctions.

Referring now to FIG. 3, there is shown a loop 200 made of superconducting material comprising an upper portion 200A and lower portion 200B. Each portions has Josephson junctions 210A and 210B respectively. From now on, $\phi_{ABD}$ will refer simply to the gravitational phase shift acquired by superconducting carriers as they travel along the upper path, while $\phi_{ACD}$ will refer to the gravitational phase h acquired by the superconducting carriers as they travel along the lower path. The fundamental equation for SQUIDs now becomes:

$$(\Theta_{\alpha 2} - \Theta_{\alpha 1}) - (\Theta_{\beta 2} - \Theta_{\beta 1}) - (\phi_{ABD} - \phi_{ACD}) = \frac{2\pi\Phi}{\Phi_0} \quad (9)$$

$$\phi_\alpha = \phi_\beta + \frac{2\pi\Phi}{\Phi_0} + Fg \quad (10)$$

where $$F = \frac{m^2 l_1 l_2}{\hbar^2}\left(\frac{\lambda}{2\pi}\right)\sin(\delta) \quad (11)$$

Demanding conservation of the electric charge, it is straightforward to show that:

$$\lambda = \frac{h}{p} = \frac{n_s qh}{mj} \quad (12)$$

where $\lambda$ is the same as before, $n_s$ is the density of charge carriers in the superconducting material, q is the charge carriers and j is the current density. It then follows that:

$$j = \frac{n_s qh}{m\lambda} \quad (13)$$

If we assume that the charge carriers of the supercurrent are Cooper pairs, we set q=2e and m=2$m_e$ where e is the magnitude of the charge of the electron and $m_e$ is the mass of the electron. One then obtains:

$$F = \frac{m_e e 8\pi n_s A l_1 l_2}{hI} \quad (14)$$

where A is the cross-section of the superconducting wire and I is the current flowing in said wire. The equations are a little less awkward if we use the current densities instead of the currents. We will also assume that the supercurrents are equal in each arm: $j_c^\alpha = j_c^\beta = j_c$ where $j_c$ is the critical current density. Then we obtain:

$$j = 2j_c \sin\left(\phi_\alpha - \frac{\pi\Phi}{\Phi_0} + \frac{Gg}{j}\right) \times \cos\left(\frac{Gg}{j} + \frac{\pi\Phi}{\Phi_0}\right) \quad (15)$$

where $$G = \frac{m_e e 8\pi n_s l_1 l_2}{h}\sin(\delta) \quad (16)$$

This represents the effect of a gravitational field on a SQUID. Contrary to the previous equation for SQUID, we now have a transcendental equation.

The calculations that we explained above can be applied to a variety of designs. In this case, each of those designs has to answer the two questions: "How high did you go?" and "How long did you stay there?". The only factors that will change in the above equations are parameters F and G. Those parameters will change from one design to another, but they will enter the equations the same way for all designs.

Figure 4:
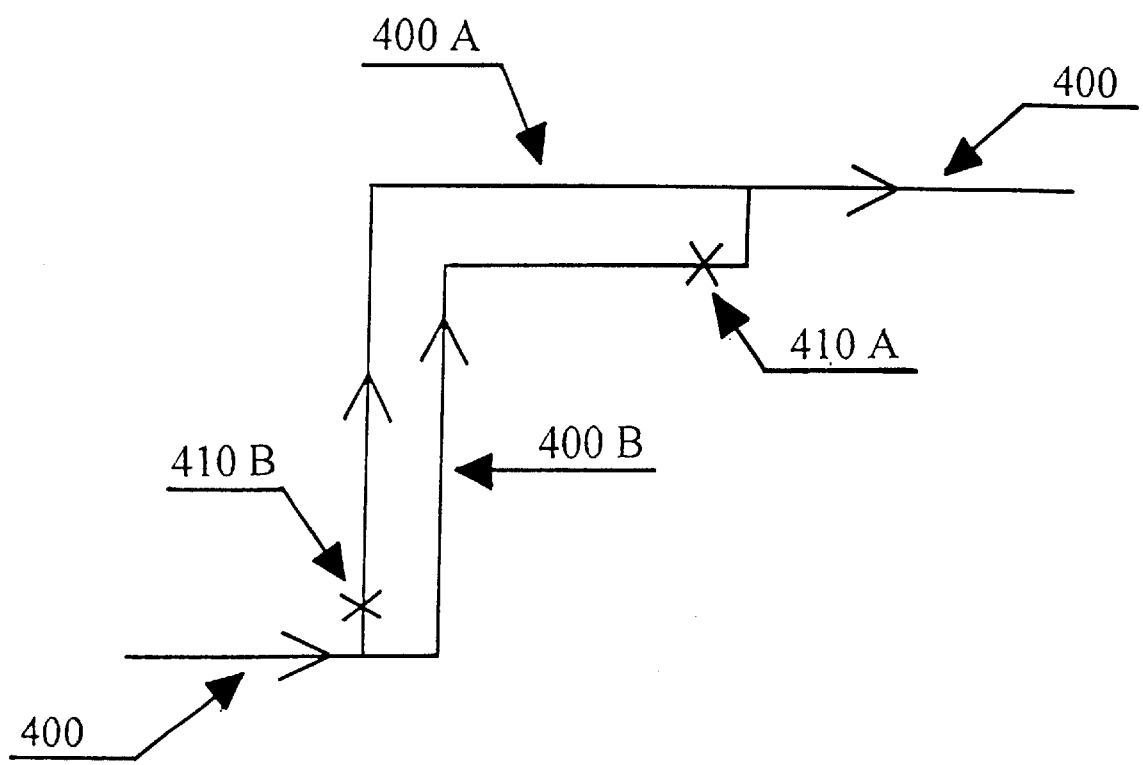
FIG. 4 shows a schematic view of SQUID according to the first embodiment of the present invention.

FIG. 4 shows a first embodiment of the present invention comprising a loop 400 made of superconducting material that splits into an upper portion 400A and a lower portion 400B. Each of these portions has a configuration of an inverted L-shape, wherein corresponding legs of those portions 400A and 400B are positioned parallel to each other. Each portion has its own phase shift inducing means or Josephson junction 410A and 410B respectively. Clearly, this design can answer the two questions and will produce gravitational phase shift.

It must be emphasized that even though FIG. 4 and all other embodiments of the present invention contain two Josephson junctions formed in each portion of the loop, the desired gravitationally induced phase shift may be obtained if the loop contains only one Josephson junction.

Figure 5:
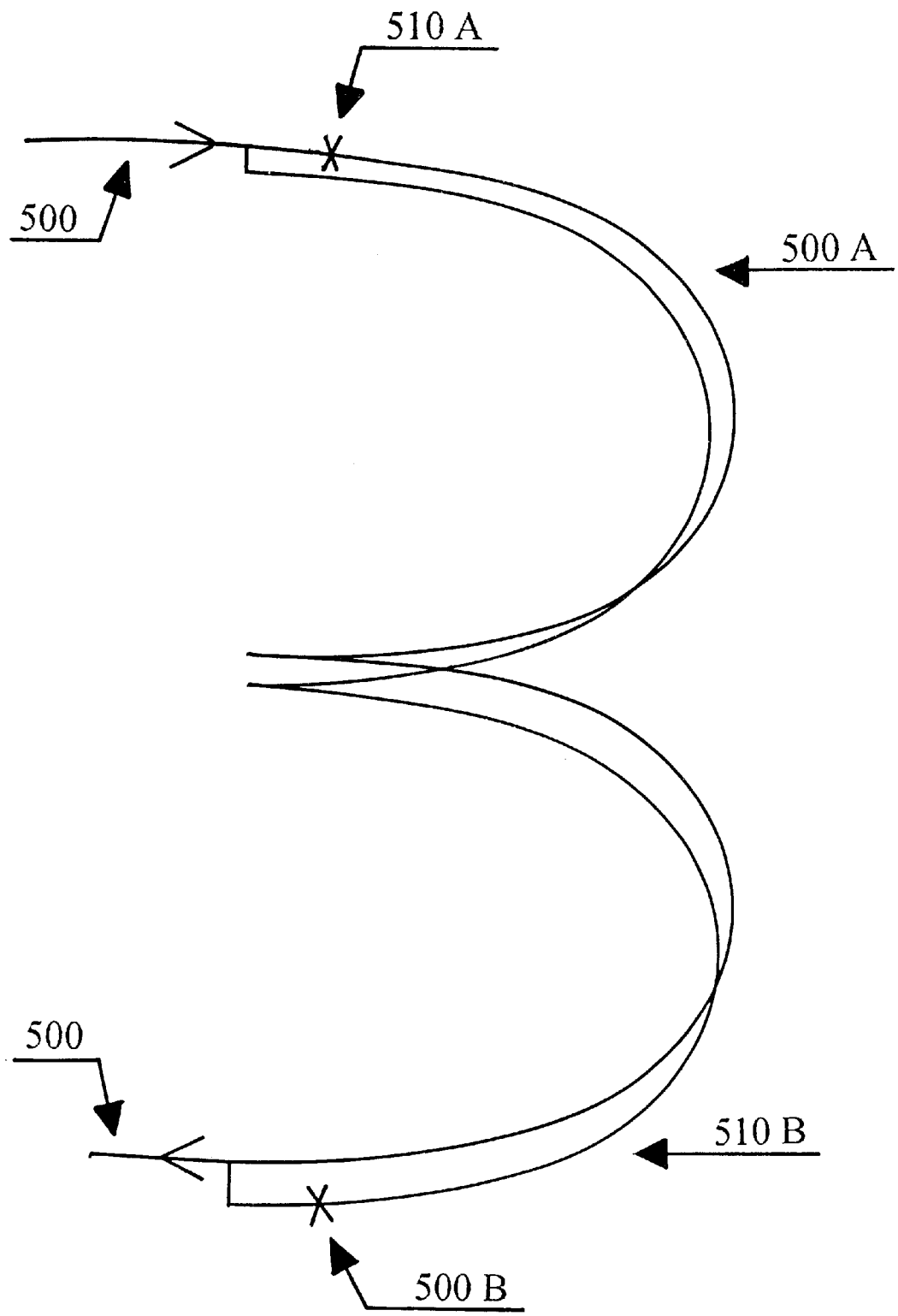
FIG. 5 shows second embodiment of the present invention.

FIG. 5 shows a second embodiment of the present invention consisting of loop 500 made of superconducting material split into the upper portion 500A and lower portion 500B. Each of those portions have a configuration of spiral segments which are placed in upstanding position and are aligned to each other. Each portion has a Josephson junction 510A and 510B respectively. It should be noted that SQUIDs in the shape of spirals were used in the past (see U.S. Pat. No. 4,280,095); however, the two paths had never before followed each other. This design can also answer our two questions and will create a gravitational phase shift.

Figure 6:
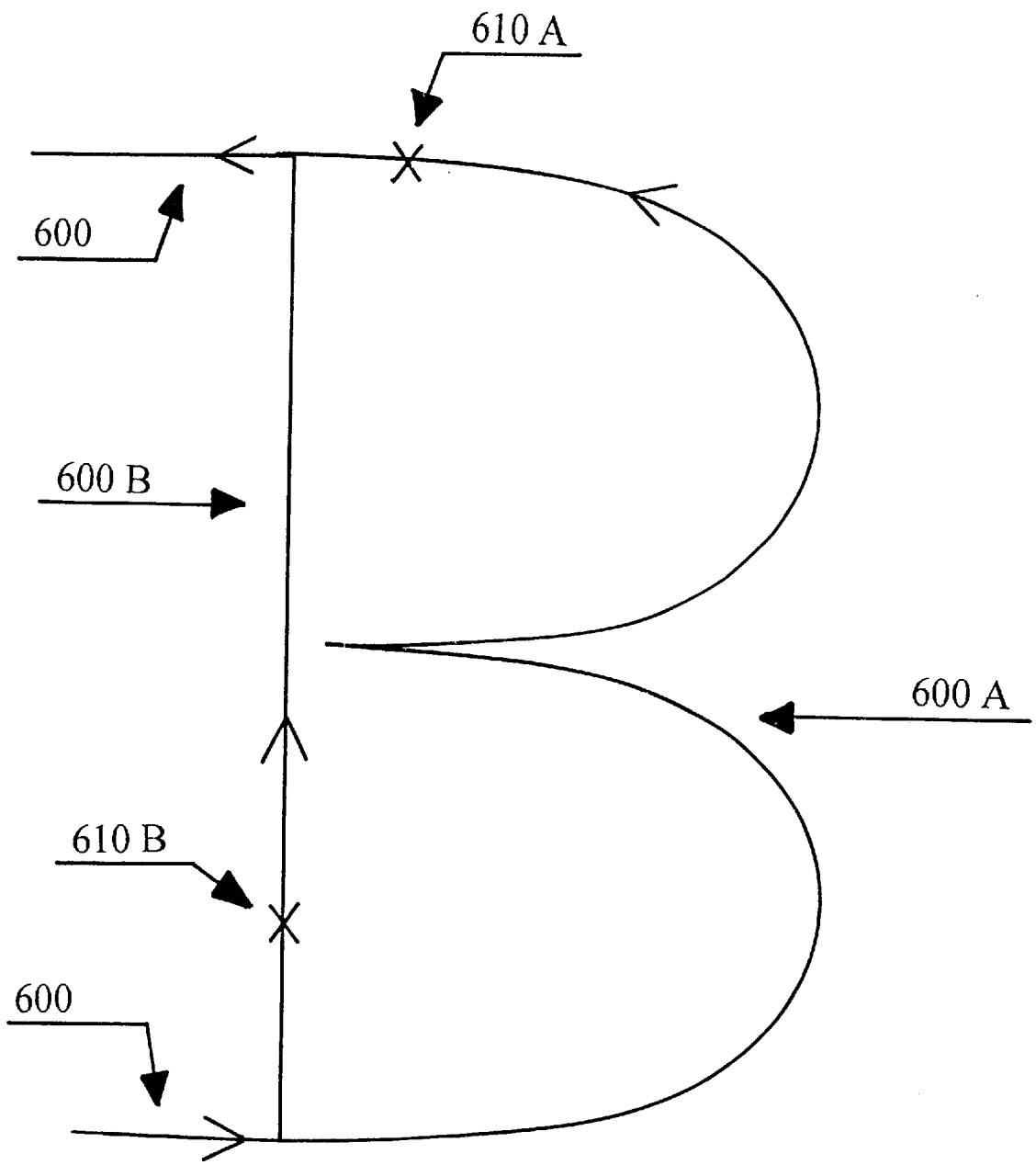
FIG. 6 show third embodiment of the present invention.

FIG. 6 shows a third embodiment of the present invention comprising a loop 600 made of superconducting material which is split into first portion 600A and second portion 600B. First portion 600A has a configuration of a vertically position segment, and the second portion 600B has configuration of a vertically positioned spiral segment. Each of these portions is provided with Josephson junction 610A and 610B respectively. The previous embodiments had upper and lower portions of equal lengths, however this is not necessary, since two portions can have different lengths, as shown on FIG. 6. What is important in this embodiment is the fact that superconducting carriers spent more time in the varying gravitational field of the Earth in the first portion 600A than in the second portion 600B.

Figure 7:
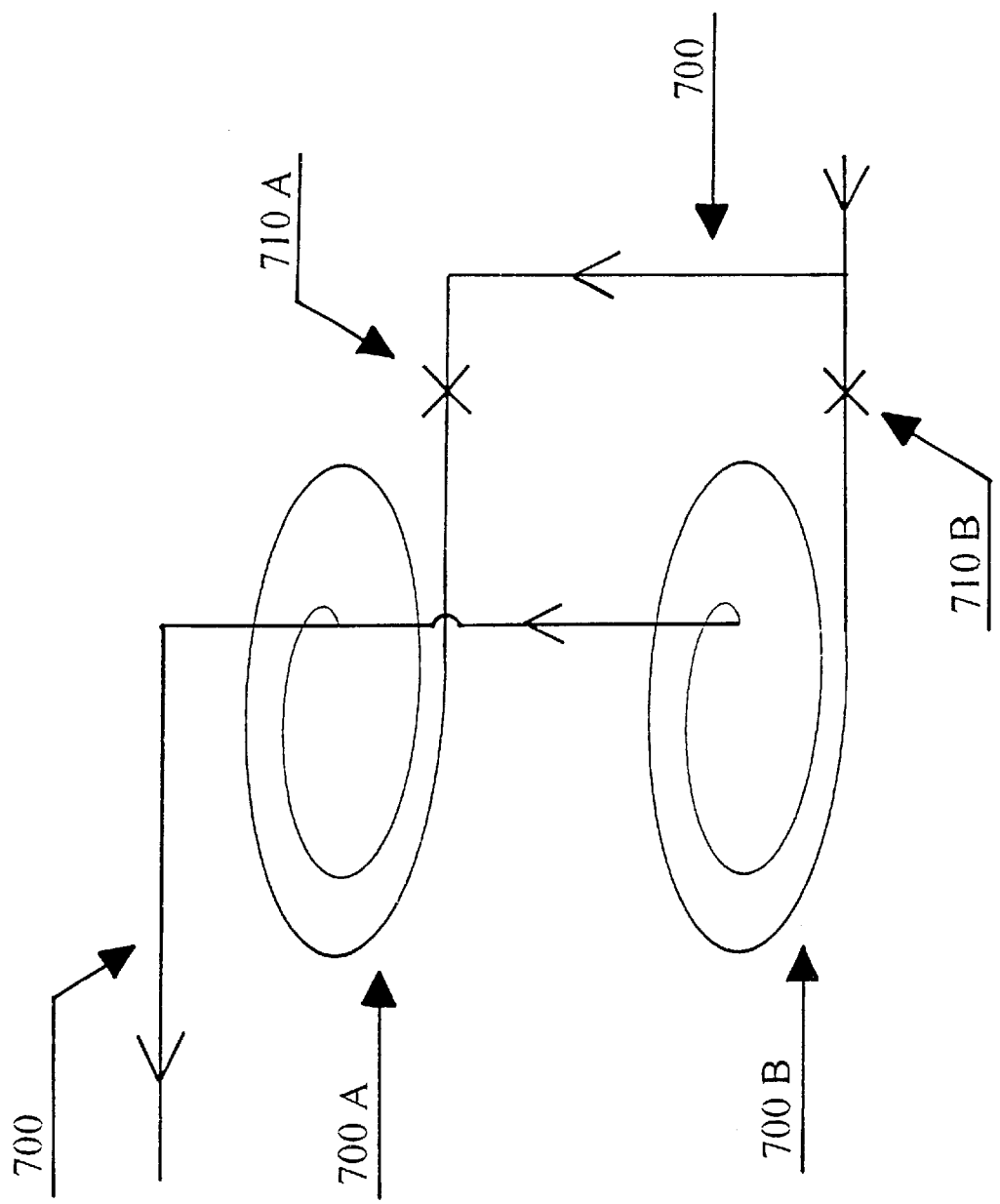
FIG. 7 shows fourth embodiment of the present invention.

FIG. 7 shows a fourth embodiment of the present invention comprising loop 700 that splits into an upper portion 700A and a lower portion 700B. Each of these portions has the configuration of spirals and has a Josephson junction 710A and 710B respectively. Configuration of spirals may be circular, but it is not necessary. Spirals could have a square configuration and will still produce a gravitational phase shift.

Figure 8:
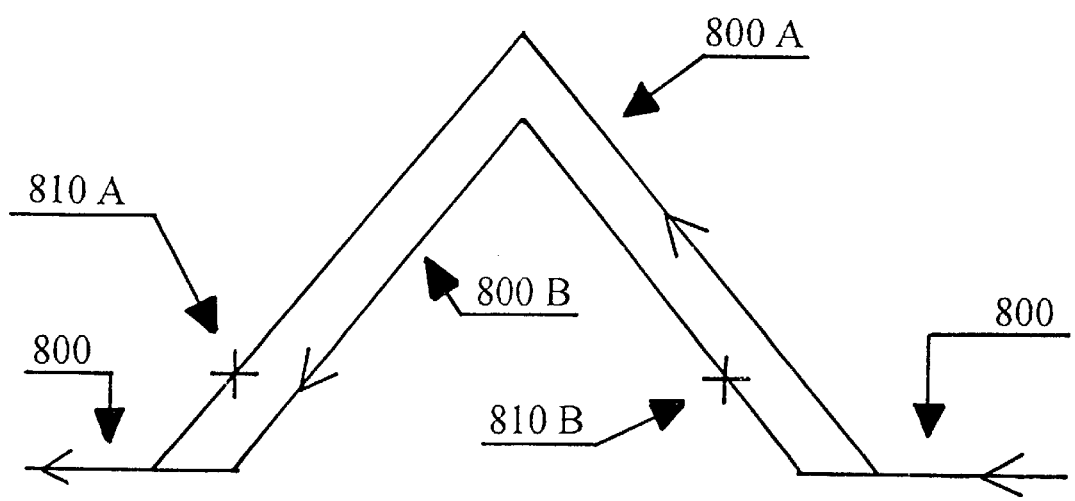
FIG. 8 shows fifth embodiment of the present invention.

FIG. 8 shows a fifth embodiment of the present invention comprising a loop 800 made of superconducting material which is split into an upper portion 800A and a lower portion 800B and provided with Josephson junctions 810A and 810B respectively. Again, the above design answers the two questions and will produce a gravitational phase shift. The advantage of this design is that the induced gravitational phase shift varies more slowly when δ is varied.

Inductance

There are two types of inductances that should be considered for SQUID: the external inductance which is sensitive to any external magnetic field and the self-inductance which is sensitive to its own current. As it is well known, it is extremely difficult to calculate an inductance, external or self-inductance. It is necessary to rely on estimates of this important parameter.

It is a very good approximation to neglect the self-inductance of the SQUID if the currents in the two arms of the loop are equal, since the self-induced flux in the loop is zero. However, when two currents are not equal (ie. $I_\alpha \neq I_\beta$), one has to take into account the self-inductance of the loop, since it will now modify the flux through the loop. One takes this effect into account by separating the current into a symmetric component ($I_{sym}=\frac{1}{2}(I_\alpha+I_\beta)$) and anti-symmetric part ($I_{anti}=\frac{1}{2}(I_{60} -I_\beta)$). The total flux now becomes to $\Phi \rightarrow \Phi+L\ I_{anti}=\Phi+L\ j_{anti}\ A$, where A is the cross-section of the superconducting wire. Our main equation then becomes:

$$j = 2j_c \mathrm{Sin}\left(\phi_\alpha - \frac{\pi\Phi + Lj_{anti}A}{\Phi_0} + \frac{Gg}{j}\right) \times \mathrm{Cos}\left(\frac{Gg}{j} + \frac{\pi\Phi + Lj_{anti}A}{\Phi_0}\right) \quad (17)$$

The appearance of the cross-section of the superconducting wire brings into the problem an undesirable parameter. In order to solve this problem one has to reduce the inductance as much as possible. Fortunately, as it was discussed before, any design that answers two questions "How high did you go?" and "How long did you stay up there?" will be sensitive to the gravitational phase shift. Thus, there is a wide variety of designs for the gravity-sensitive SQUID of the present invention that would be totally useless for SQUIDs used as magnetometers. Indeed, when a SQUID is used as a magnetometer or as a superconducting gyroscope, the area of the loop is very important, since either the SQUID itself must be sensitive to a change in the ambient magnetic field, or it must be inductively coupled to a pick-up coil. In either case, the area of the loop should be as large as possible, but this would increase its inductance. It is well known that inductance is one of the limiting factors in the use of SQUIDs as magnetometers, and a SQUID with zero inductance would be perfect as far as the noise is concerned. As a result, the design of SQUID represents a trade-off between sensitivity to ambient magnetic field, or phase shift induced by rotation in a superconducting gyroscope, and noise that will spoil the data. A SQUID sensitive to a gravitationally-induced phase shift can have an area of the loop as small as we want, since this phase shift does not depend on the area of the loop.

Figure 9:
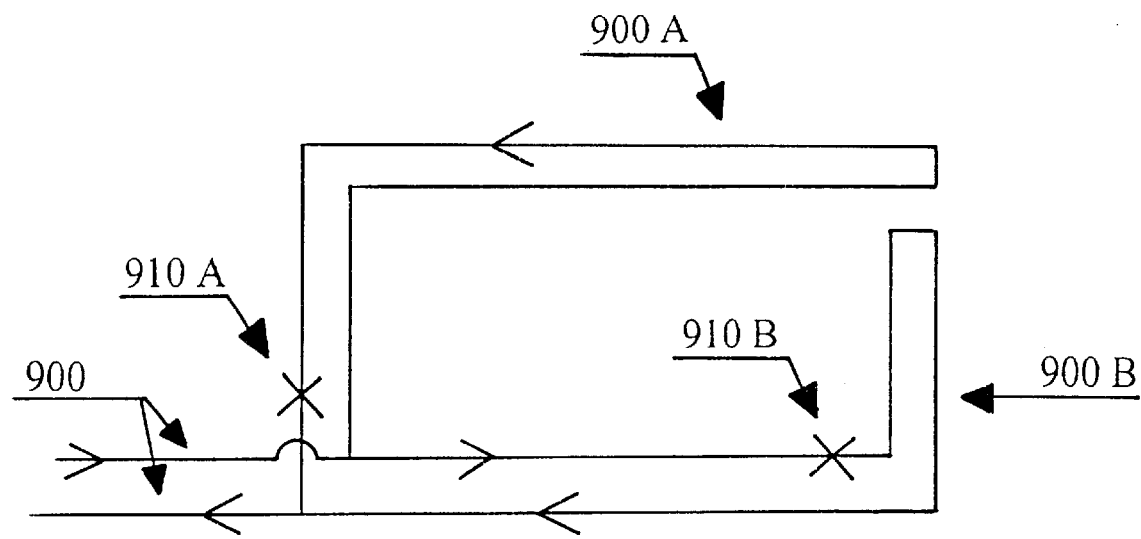
FIG. 9 shows sixth embodiment of the present invention.

FIG. 9 shows a sixth embodiment of the present invention which is similar to one shown on FIG. 2, wherein a loop 900 is made of superconducting material and splits into an upper portion 900A and a lower portion 900B, wherein each of those portions are folded or double back on themselves to facilitate reduction on the inductance of the SQUID. Each portion has its own Josephson junction 910A and 910B respectively. The SQUID of FIG. 9 is planar and could be easily micro-machined on a micro-chip. The potential problem of having two wires of each arm touching each other could be avoided by having the out-going cable go out of the plane.

Figure 10:
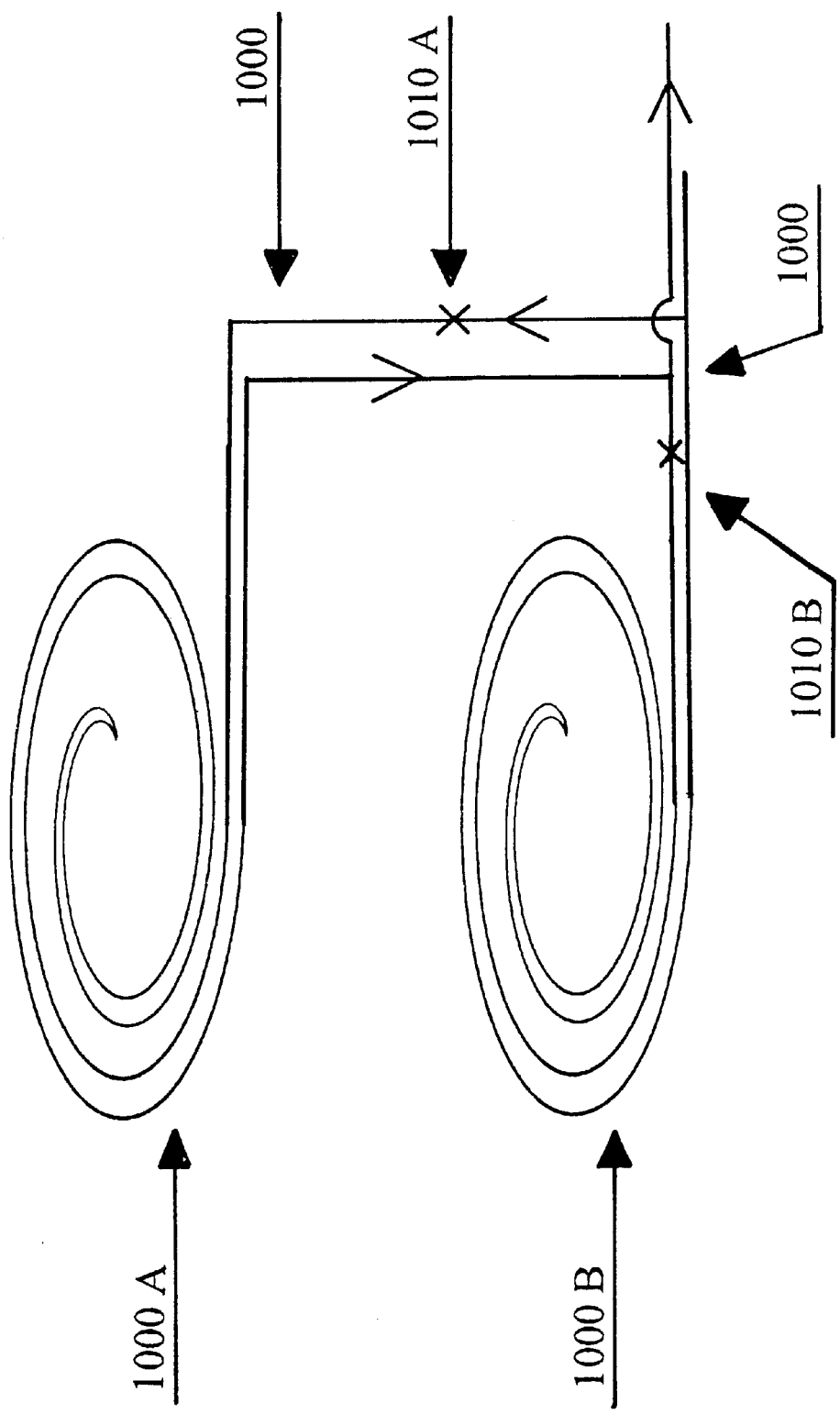
FIG. 10 shows seventh embodiment of the present invention.

FIG. 10 shows a seventh embodiment of the present invention which is similar to FIG. 7, except that two spiral paths are now coming back onto themselves in both upper and lower levels in order to reduce the inductance. As on FIG. 7, a loop 1000 is formed from superconducting material and consists of an upper portion 1000A and a lower portion 1000B, both provided with Josephson junctions 1010A and 1010B respectively.

Figure 11:
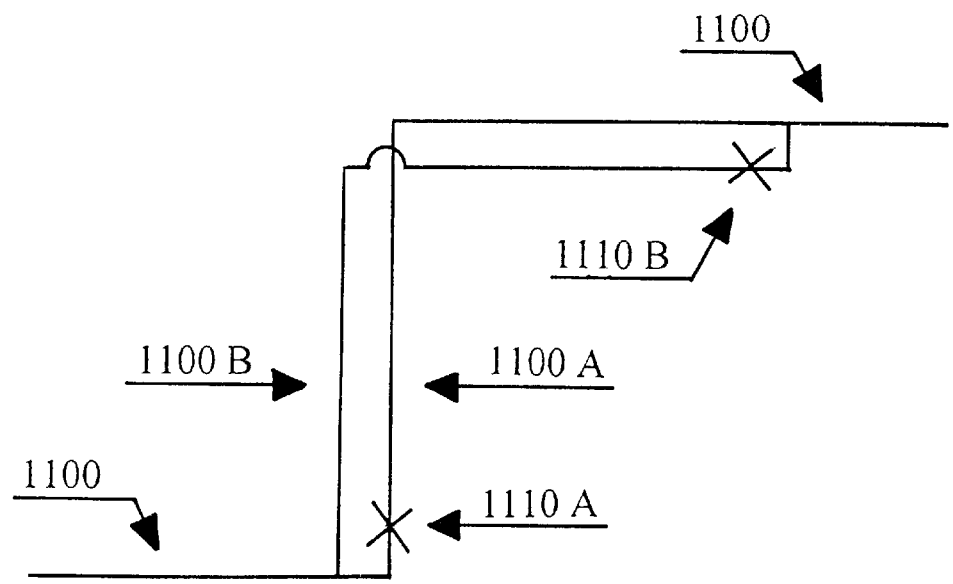
FIG. 11 shows eighth embodiment of the present invention.

FIG. 11 shows an eighth embodiment of the present invention which is similar to FIG. 4 and comprising loop 1100 made of superconducting material consisting from an upper portion 1100A and a lower portion 1100B both provided with Josephson junctions 1110A and 1110B respectively. If compared to embodiment of FIG. 4, both portions are now shifted to greatly reduce the inductance.

Figure 12:
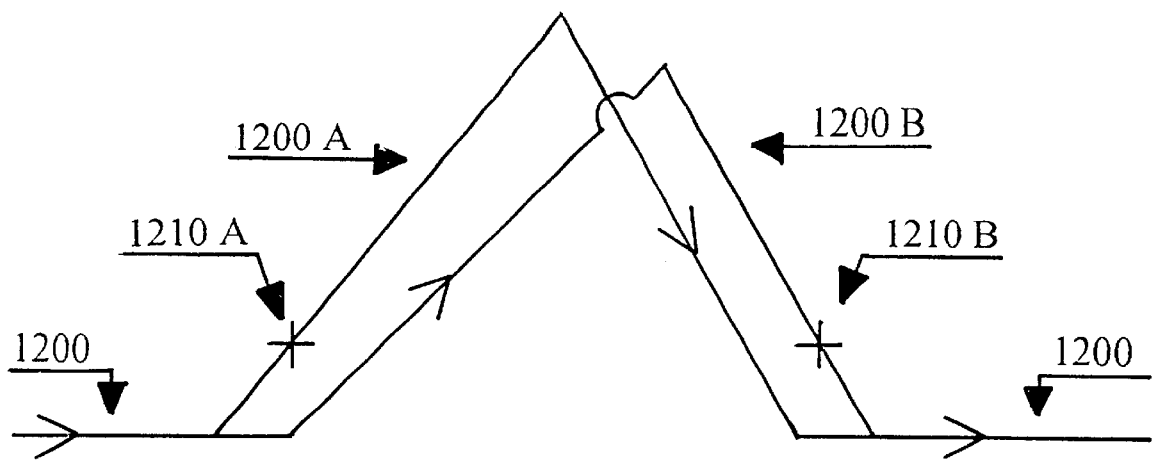
FIG. 12 shows ninth embodiment of the present invention.

FIG. 12 shows a ninth embodiment of the present invention comprising a loop 1200 made of a superconducting material divided into an upper portion 1200A and a lower portion 1200B and provided with Josephson junctions 1210A and 1210B respectively. This design is similar to one shown on FIG. 8, but both portions are shifted.

It is well known that twisting of the cable greatly reduces the inductance of the cables. Such principle is used for embodiment of the present invention shown on FIG. 13.

Figure 13:
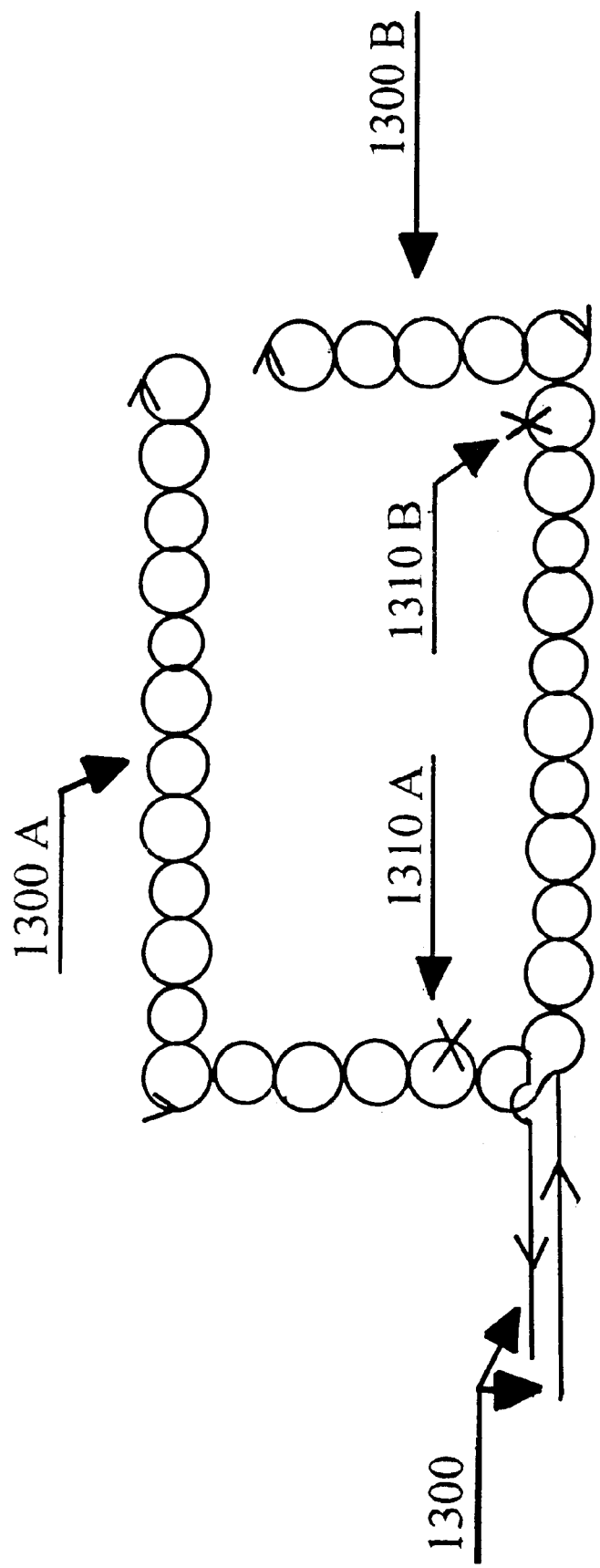
FIG. 13 shows tenth embodiment of the present invention.

FIG. 13 shows a tenth embodiment of the present invention comprising a loop 1300 made of a superconducting material and divided into an upper portion 1300A and a lower portion 1300B, each provided with a Josephson junction 1310A and 1310B respectively. On this design "twisting" of portions is more evident, since both portions are actually twisted. The wires must be insulated from each other to avoid short circuit. Clearly, design of FIG. 13 would be difficult to manufacture.

It must be emphasized, that although all modifications of the present invention show use of two Josephson juctions in the loop, present invention is not restricted to such arrangements, and use of more junctions in the loop will stiff be within the scope of the present invention.

The above embodiments are shown as samples only, since for a person skilled in the art the possibilities on any other configuration of the loop are endless, but all will be within the scope of the present invention facilitating positioning of the first portion of the superconductor loop in relationship to the second portion. in such a way that superconducting carriers conducted through said first portion spent a period of time at a different gravitational potential of the Earth than superconducting carriers conducted through said second portion, thus creating a gravitationally induced phase shift.

Shielding

As it is clearly seen from equations (15) and (17), the effect of any magnetic field is still present through the term Φ. In order to see the effect that we want, we will have to shield as perfectly as possible the SQUID from any stray magnetic field. It is well known that the magnetic field inside a superconducting material is zero, since superconducting material is a perfect dielectric. One possible design would be to cover the SQUID by superconducting shielding, such as a box for "the bulky designs", or sandwich for type of shielding for the "flat" design. The difference between shielding used for known SQUIDs, such as shown in U.S. Pat. No. 5,173,660, will be the fact that the SQUID of the present invention is completely shielded and does not have any connections to a pick-up coil. Indeed, when the SQUID used as magnetometer is shielded, the goal is to have the pick-up coil only to be sensitive to the magnetic field. If the SQUID itself is exposed to the magnetic field, the data will be misleading. Therefore, known shielded SQUIDs are always (inductively) connected to a pick-up coil. As it was emphasized before, SQUID of the present invention does not have a pick-up coil, and it should be shielded from any magnetic field as well as possible.

Figure 14:
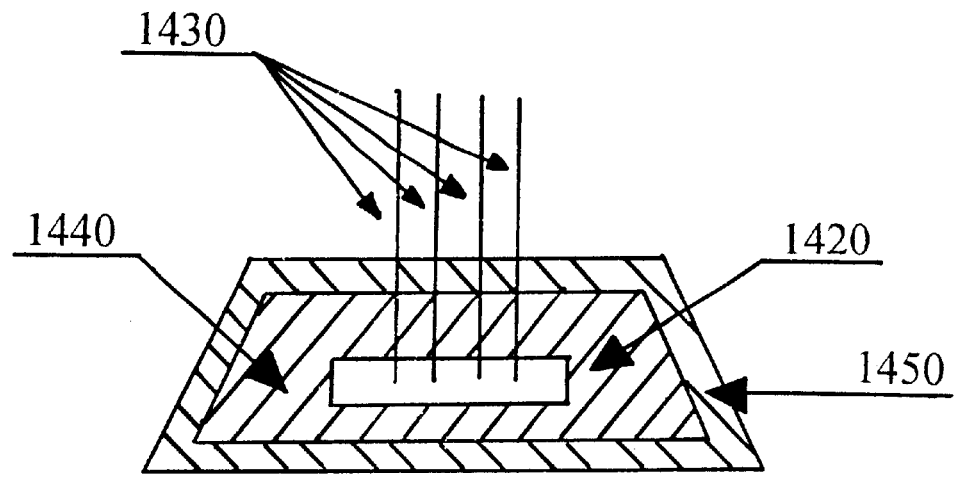
FIG. 14 shows a cross-sectional view of shielding of a flat design of SQUID according to the present invention.

FIG. 14 shows a cross-section of a "flat" design 1420 of SQUID, such as shown on FIGS. 4, 8 and 9. SQUID 1420 is placed within a sandwich made of a superconducting shield 1450, wherein the SQUID 1420 is insulated from said superconducting shield 1450 by means of a layer 1440 made of an insulating material The only openings that superconducting shield 1450 has are for wires 1430 that connect the SQUID to the outside.

Figure 15:
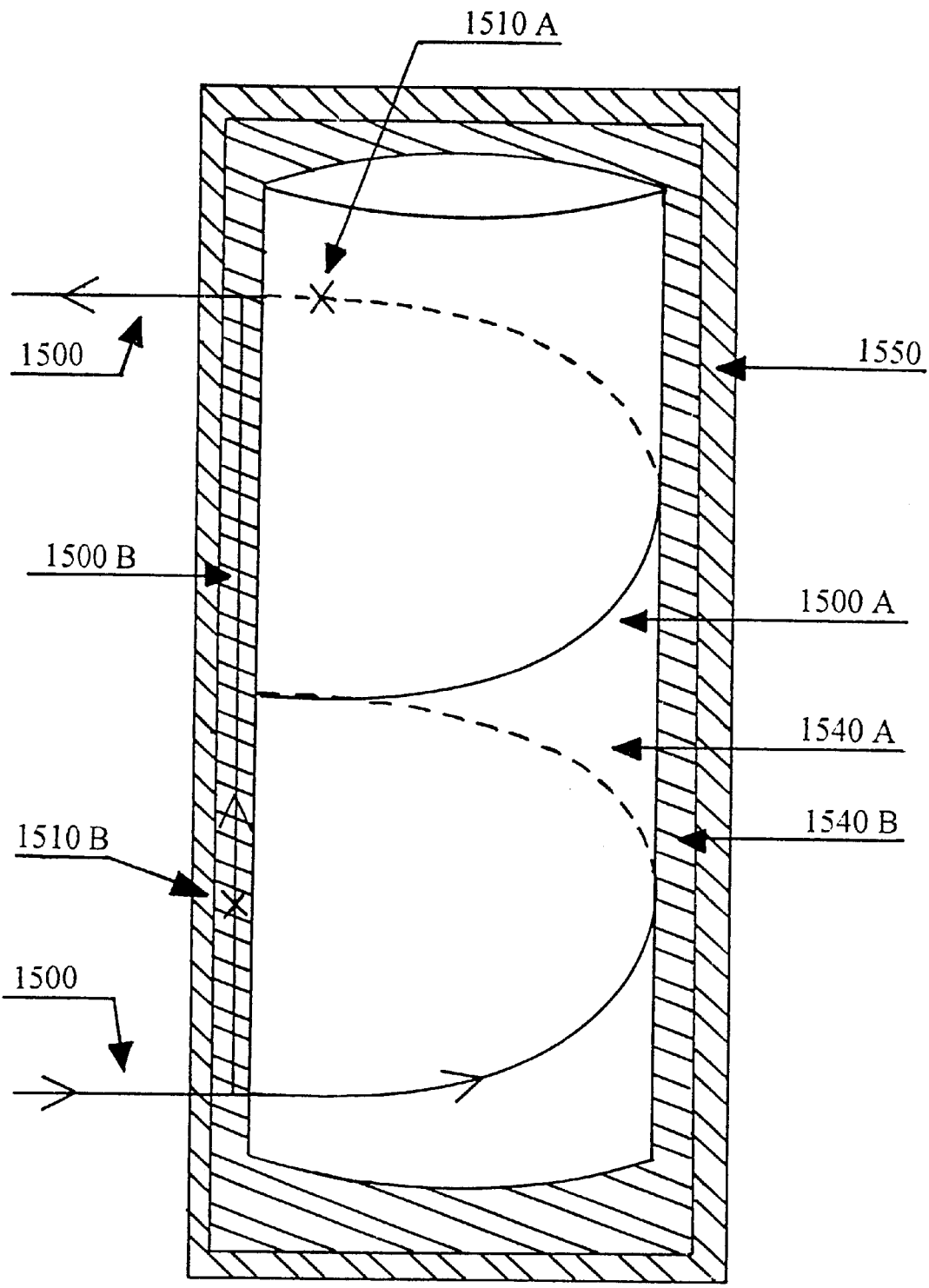
FIG. 15 shows a cross-sectional view of shielding of a bulky design of SQUID according to the present invention.

FIG. 15 shows a shielding arrangement used for "bulky" designs of SQUIDs similar to one shown on FIG. 6. In this case, the SQUID comprises a loop 1500 split in an upper portion 1500A and a lower portion 1500B provided with Josephson junctions 1510A and 1510B, and mounted around a cylinder 1540A made of an insulating material. The loop 1500 is further covered by another layer of insulating material 1540B. The final shielding layer 1550 is made of a superconducting material. In this case, the only openings which are not shielded are the wires 1530 connected to outside electronics.

Figure 16:
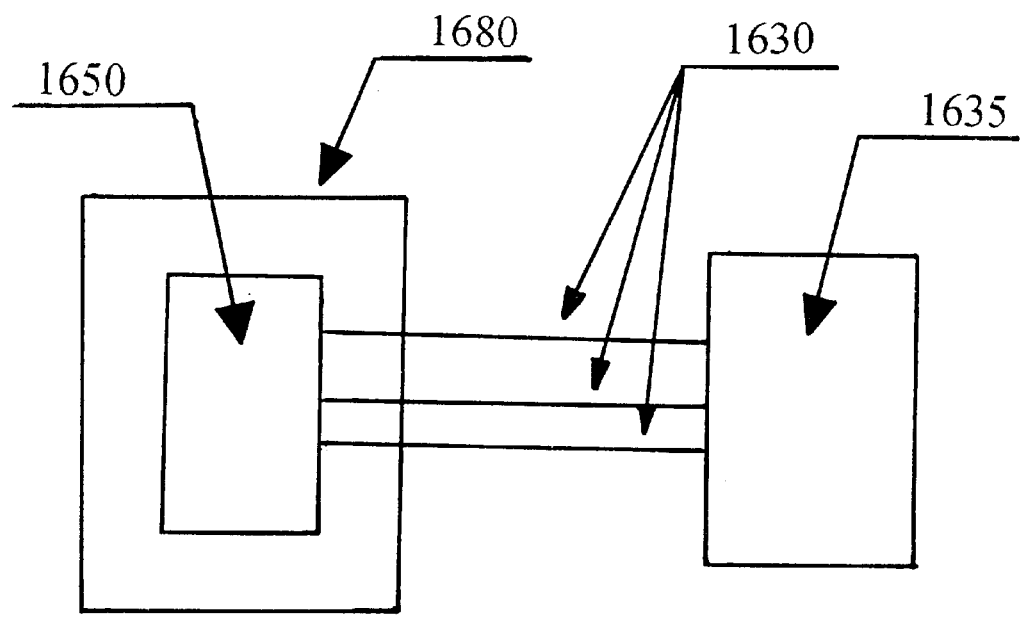
FIG. 16 shows a schematic bloc-diagram of an apparatus according to the present invention.

FIG. 16 shows a standard arrangement of connecting any shielded SQUID 1650 of the present invention placed inside container 1680 and connected by means of wires 1630 to a standard electronic equipment 1635 in order to measure the superconducting current flowing through the loop.

In order to obtain an absolute value of $\vec{g}$, it is necessary to vary the angle between the plane of the SQUID and the horizontal plane. There are numerous possibility to facilitate such tilting.

Figure 17:
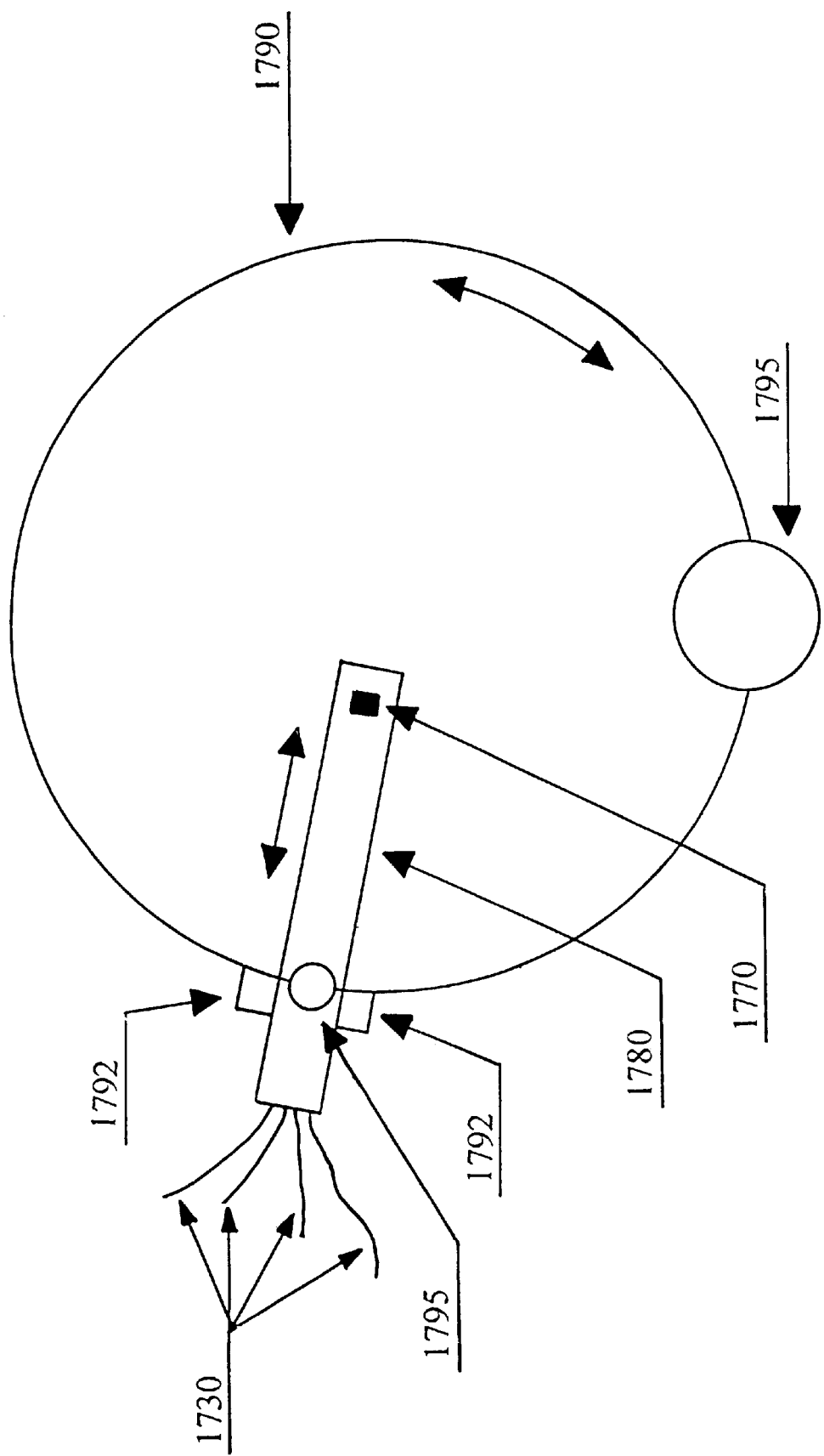
FIG. 17 shows a schematic cross-sectional view of tilting means according to a first modification of the present invention.

FIG. 17 shows the SQUID in its superconducting shielding 1770 placed in a cylindrical container 1780 filled with refrigerating liquid. Container 1780 in turn is mounted on a supporting cylinder 1790 that is capable to freely rotate around its horizontal axis. The container 1780 is fixed inside the supporting cylinder 1790 by means of collar 1792. The supporting cylinder 1790 is capable to be rotated around horizontal axis by means of a high precision gears 1795 similar to those described in U.S. Pat. No. 5,549,523. Besides, container 1780 can also move radially in and out of the cylinder 1790 by means of high precision gear 1795. The advantage of this system is that when the SQUID 1770 is at the location corresponding to the centre of rotation of the supporting cylinder 1790, it maintains the same height when the cylinder 1790 is rotated around its horizontal axis. However, when SQUID 1770 is moved radially from the centre of cylinder 1790, it will rise or fall when cylinder 1790 is rotating. Present arrangement of tilting mechanism allows to facilitate consistency check on the data.

Figure 18:
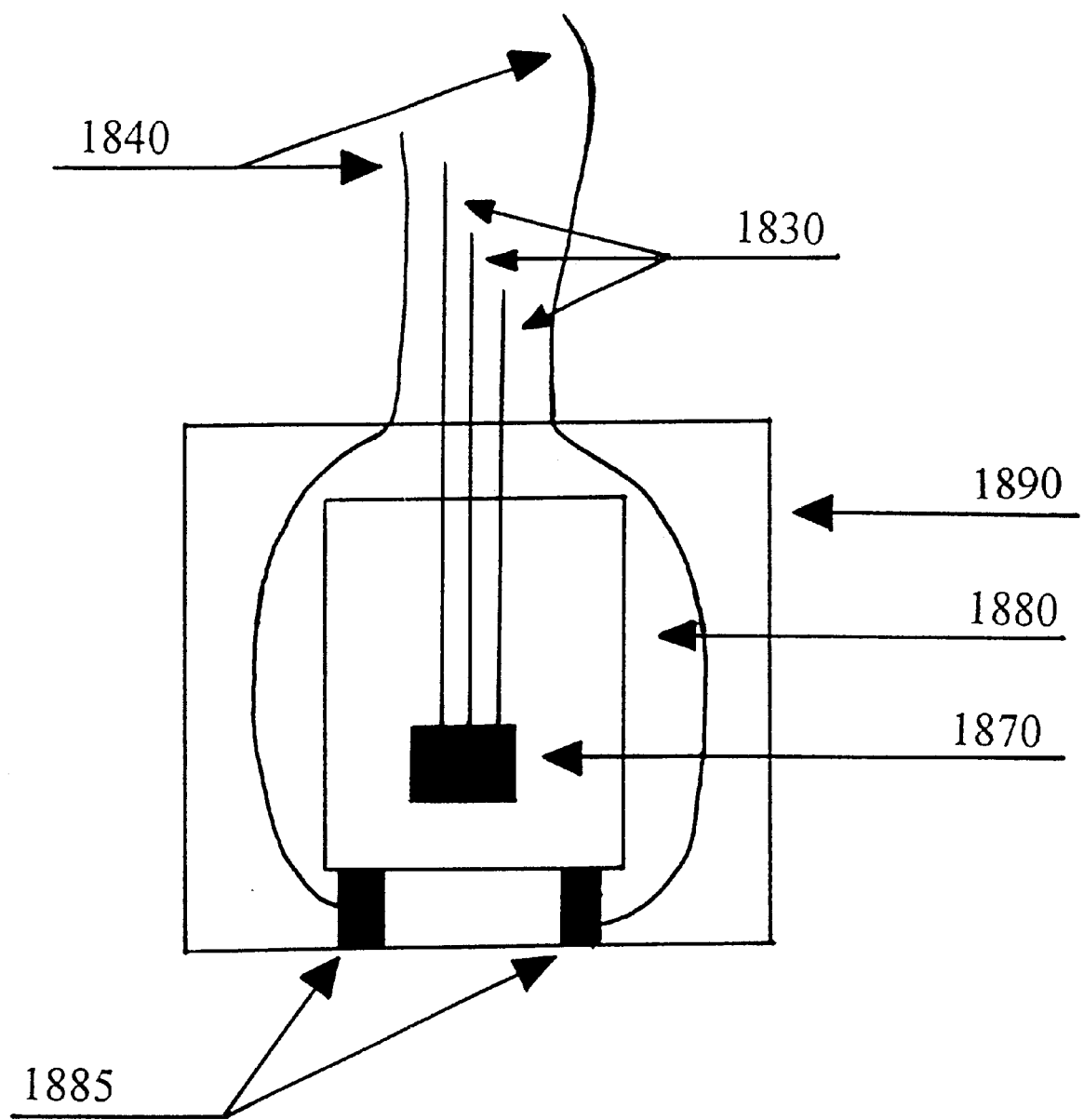
FIG. 18 shows a schematic cross-sectional view of tilting means according second modification of the present invention.

FIG. 18 shows another embodiment of tilting mechanism comprising SQUID 1870 connected to wires 1830 and placed within a container 1880 filled with a refrigerating liquid. A number of piezo-electric crystals 1885 are placed below the container 1880 and are connected by wires 1840 to a power supply which allows the variation of the tension on crystals, thus tilting the system. The whole system is enclosed inside of a container 1890.

Now we will explain the method of measuring the absolute value of gravity using apparatus of the present invention. From equations (15) and (17) it is clear that the current flowing through the SQUID varies with the tilting angle in a highly non-linear manner. At the beginning the SQUID should be positioned at a certain angle and the first measurement of current is done. Then the plane of the SQUID is rotated which will change the value of the conducted current. The current should be measured continuously during the rotation of the SQUID. In this case, the greater the number of readings is made during such rotation, the better the result. When the rotation is over, it is necessary to make a last measurement at the final point. From the value of the current flowing through the loop taken as a function of the rotation angle one can extract the absolute value of $\vec{g}$. Due to the high sensitivity of the instrument, this range of angle can be rather small and a few degrees of rotation will be sufficient. It is important to emphasize that the time it takes to vary the angle is not important, since this time will simply be dependant on the kind of electronics used and its rapidity to respond to a variation of the current. Therefore, one could perform these measurements in seconds or in a few minutes. Furthermore, the absolute value of the angle is also not the most important parameter. The range of angles covered during rotation of SQUID or the angle displacement of the apparatus from the initial point to the final point is the most important parameter, and this parameter should be known with the highest precision possible.

Tilting mechanism of FIG. 17 allows to measure the absolute value of $\vec{g}$ by rotating supporting cylinder 1790. Since the required range of rotation to get the absolute value of $\vec{g}$ is rather small, one can assume that the height of the SQUID is very close of being constant.

As shown on FIG. 17, it is possible to change position of the SQUID inside the supporting cylinder 1790 by means of radial movement of SQUID 1770 inside the container 1790. In this case SQUID 1770 is capable to move inside the container 1780 from the position coinciding with the centre of the support cylinder 1790 to the position coinciding with the outer wall of said support cylinder 1790. In case the SQUID is in the centre of cylinder 1790, its height will not change when the cylinder is rotated around the horizontal axis. Such positioning of SQUID 1770 allows the measurement at a constant height (neglecting the variation in height due to the size of the SQUID itself) while going full circuit of rotation of cylinder 1790 around its horizontal axis. On the other hand, the height will change substantially if the SQUID 1770 will be moved radially towards the outer wall of the cylinder 1790. In this position it is possible to make a consistency check on the data between two measurements, which is one of advantages of the present invention. It is also possible to rotate the container 1780 to see another aspect of the effect of the angle of rotation.

In order to measure the variation of $\vec{g}$ with time, one simply monitors the value of the current flowing through the loop. As it is shown on equations (15) and (17), if $\vec{g}$ varies, the current flowing though the loop will vary. Therefore, it is necessary to measure the current continuously. The frequency of such measurements may be from a few seconds to a few hours. From the variation of the current it is possible to extract the variation of $\vec{g}$. The sensitivity of the apparatus to variations of $\vec{g}$ is enhanced for specific values of the different parameters. Once the physical parameters of the SQUID, such as materials, size, configuration, are fixed, the user is capable to reach greater sensitivity by varying the angle. The sensitivity of the apparatus to variations of $\vec{g}$ will be enhanced at some specific values of the angle, that clearly could be seen by differentiating equations (15) and (17) with respect to $\vec{g}$.

Apparatus using tiling mechanism of FIG. 18 also allows to control precisely the tilting angle of the system This arrangement may be further modified (not shown) by placing peizo-electric crystals inside the container 1880 filled with refrigerating liquid so that they would have to tilt only a very small weight of the SQUID itself However, the heat produced by the crystals may create a problem for the SQUID.

It must be emphasized that tilting systems of FIGS. 17 and 18 are samples only and the present invention is not restricted to such arrangements. Any other mechanical equivalents are possible to one skilled in the art.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

What is claimed is:

1. Apparatus for measuring gravitational attraction of the Earth comprising:
   a loop formed from a superconductor material, said loop being divided into
   a first portion and
   a second portion,
   said first and second portions having a predetermined length and configuration,
   said loop being positioned under predetermined angle with respect to a horizontal plane;
   means for initiation of a flow of superconducting carriers in each of said first and second portions;
   at least one phase shift inducing means formed in said loop;
   wherein said first portion being positioned with respect to said second portion in such a way that the superconducting carriers conducted through said first portion spend a period of time at a different gravitational potential of the Earth than superconducting carriers conducted through said second portion, thus creating a gravitationally induced phase shift;
   said apparatus being completely isolated from influence of any external magnetic field.

2. Apparatus according to claim 1, wherein said loop is formed from a superconductor wire, and wherein said phase shift inducing means is a Josephson junction.

3. Apparatus according to claim 2, wherein said Josephson junction is formed in each of said first and said second portions.

4. Apparatus according to claim 1, wherein said first portion is positioned above said second portion.

5. Apparatus according to claim 4, wherein each of said first and said second portions has an inverted L-shape configuration, wherein corresponding legs of said L-shaped portions are positioned in parallel alignment to each other.

6. Apparatus according to claim 5, wherein said second portion shifts in relation to said first portion.

7. Apparatus according to claim 4, wherein each of said first and said second portions has a configuration of a spiral segments aligned to each other, wherein said spiral segments are placed in upstanding positions.

8. Apparatus according to claim 4, wherein said first portion has a configuration of a vertically positioned line segment and wherein said second portion has a configuration of a vertically positioned spiral segment.

9. Apparatus according to claim 4, wherein said first portion has a configuration of a horizontally oriented upper spiral segment and wherein said second portion has a configuration of a horizontally oriented lower spiral segments, wherein said upper and lower spiral segments are connected with each other by vertically positioned line segments.

10. Apparatus according to claim 9, wherein each of said first and said second portions are folded or double back onto themselves to facilitate reduction of an inductance in said apparatus.

11. Apparatus according to claim 4, wherein said first portion has a configuration of an inverted L-shape, said first portion consists of upper section and lower sections placed in a close proximity to each other, and wherein said second portion has a configuration of mirror-inverted L-shape, said second portion consists of an upper section and a lower section placed in alignment and in a close proximity to each other.

12. Apparatus according to claim 11, wherein each of said first and said second portions are twisted.

13. Apparatus according to claim 4, wherein each of said first and said second portions has an inverted V-shape configuration.

14. Apparatus according to claim 13, wherein said second portion shifts in relation to said first portion.

15. Apparatus according to claim 1, wherein said apparatus further comprises a tilting means adapted to position said apparatus under any desirable angle to facilitate control of said gravitationally induced phase shift.

16. Apparatus according to claim 1, wherein the configuration and the length of said first and second portions are variable to facilitate control of said gravitationally induced phase shift.

17. Apparatus according to claim 1, wherein said apparatus is placed into a protective housing made of a material provided to protect said apparatus from the external magnetic field.

18. Method of measuring an absolute value of gravity of the Earth comprising:
   measuring variation of a current conducted through a superconductor loop of an apparatus for measuring gravitational attraction of the Earth,
   wherein said measurement comprises the following steps:
      measuring the current flowing through the superconductor loop of said apparatus at initial position;
      tilting said apparatus by tilting means under predetermined angle, wherein the current flowing through said superconductor loop is being continuously measured during tilting of said apparatus;
      measuring the current flowing through said superconductor loop at a final position,
      wherein said tilting means are adapted to facilitate a precise control of an angular displacement of said apparatus from said initial position to said final position.

19. Method according to claim 18, wherein said tilting means comprises a horizontally oriented cylinder, and wherein said apparatus is mounted within said cylinder; said apparatus is adapted to move radially within said cylinder from a central position coinciding with a horizontal axis of said cylinder to a remote position co-inciding with an outer wall of said cylinder, said cylinder is adapted to tilt said apparatus by means of rotation of said cylinder around the horizontal axis.

20. Method according to claim 19, wherein said tilting means are further adapted to facilitate a verification of consistency of measurement of the absolute value of gravity by means of varying positioning of said apparatus from the cental position to the remote position, and by repeat measurement of the absolute value of gravity at said remote position.

21. Method for measuring a variation of gravity of the Earth with time comprising:

measuring variation of a current flowing through a superconductor loop of an apparatus for measuring a gravitational attraction of the Earth, wherein said measurement comprises continuous measurement of the current flowing through said superconductor loop during a predetermined amount of time, and wherein said superconductor loop is being positioned under a predetermined angle with respect to a horizontal plane.

* * * * *